(12) United States Patent
Wang et al.

(10) Patent No.: US 9,895,004 B2
(45) Date of Patent: Feb. 20, 2018

(54) MAT WITH THERMOSTATIC LAYER BETWEEN TWO LAYERS OF FOAM TO REDUCE HEAT ACCUMULATION AND METHOD FOR MAKING THE SAME

(71) Applicant: SEDA CHEMICAL PRODUCTS CO., LTD., New Taipei (TW)

(72) Inventors: Wei-Kuan Wang, New Taipei (TW); Jung-Hung Su, New Taipei (TW)

(73) Assignee: SEDA CHEMICAL PRODUCTS CO., LTD., New Taipei (TW)

( * ) Notice: Subject to any disclaimer, the term of this patent is extended or adjusted under 35 U.S.C. 154(b) by 0 days.

(21) Appl. No.: 15/655,975

(22) Filed: Jul. 21, 2017

(65) Prior Publication Data
US 2018/0020842 A1    Jan. 25, 2018

(30) Foreign Application Priority Data

Jul. 21, 2016 (TW) .............................. 105123031 A

(51) Int. Cl.
| | |
|---|---|
| *A47C 31/00* | (2006.01) |
| *A47C 27/15* | (2006.01) |
| *B68G 7/00* | (2006.01) |
| *B68G 5/02* | (2006.01) |
| *B32B 37/12* | (2006.01) |
| *B32B 5/18* | (2006.01) |

(52) U.S. Cl.
CPC .............. *A47C 31/00* (2013.01); *A47C 27/15* (2013.01); *B32B 5/18* (2013.01); *B32B 37/12* (2013.01); *B68G 5/02* (2013.01); *B68G 7/00* (2013.01); *B32B 2307/30* (2013.01); *B32B 2307/724* (2013.01); *B32B 2601/00* (2013.01)

(58) Field of Classification Search
CPC ....................................................... A47C 31/00
USPC ............................................ 5/417, 420, 740
See application file for complete search history.

(56) References Cited

U.S. PATENT DOCUMENTS

| | | | |
|---|---|---|---|
| 6,193,855 B1 * | 2/2001 | Gopalraja ............. | C23C 14/046 204/192.12 |
| 2003/0109908 A1 * | 6/2003 | Lachenbruch ....... | A47C 21/046 607/96 |
| 2016/0166074 A1 * | 6/2016 | Rose ................... | A47C 21/046 5/636 |

* cited by examiner

*Primary Examiner* — Frederick C Conley
(74) *Attorney, Agent, or Firm* — Bacon & Thomas, PLLC

(57) ABSTRACT

A mat with a thermostatic layer between two layers of foam to reduce heat accumulation and the manufacturing process thereof, which includes a supporting foam layer, an air permeable foam layer, and the thermostatic layer; wherein the thermostatic layer lies on the top side of the supporting foam layer and includes phase change material (PCM) microcapsules and a bonding material; the air permeable foam layer has larger pores than the supporting foam layer, and has its bottom side attached to the thermostatic layer, and is thus bonded to the supporting foam layer via the bonding material. When a user lies on the air permeable foam layer, the user's body skin is not directly pressed against the PCM microcapsules, thereby allowing the PCM microcapsules to communicate with the ambient air through the pores in the air permeable foam layer and to dissipate heat rapidly for keeping the mat cool.

6 Claims, 5 Drawing Sheets

MAT WITH THERMOSTATIC LAYER BETWEEN TWO LAYERS OF FOAM TO REDUCE HEAT ACCUMULATION AND METHOD FOR MAKING THE SAME

FIELD OF THE INVENTION

The present invention relates to a mat with a thermostatic layer between two layers of foam to reduce heat accumulation and the manufacturing process thereof, and, more particularly to a mat made by first forming a thermostatic layer on the top side of a supporting foam layer and then attaching an air permeable foam layer to the thermostatic layer. Due to the relatively large pores in the air permeable foam layer, phase change material microcapsules in the thermostatic layer can communicate with the ambient air through the pores to dissipate heat while a user lies on the mat.

BACKGROUND OF THE INVENTION

A phase change material (PCM) is a substance with a high heat of fusion that melts or solidifies at a specific temperature and that absorbs or releases heat during a change of phase (i.e., state of matter). PCM were first discovered in the 1950s and were extensively researched and put to practical use in the 1970s. Today, PCM have found application in construction materials, textiles, beddings, aerospace materials, and refrigeration equipment, to name only a few.

More than 6000 PCMs are currently known. They can be divided by material property into four major types: inorganic (e.g., salt hydrates), organic (e.g., paraffin, fatty acids, and their polymers), polymeric, and composite. Generally speaking, a PCM is made into "microcapsules" when used in mattresses. A "microcapsule" in this context refers to a tiny capsule formed by a process called microencapsulation to enclose a solid, liquid, or gaseous PCM (referred to as "core") in a shell (referred to as "wall"), wherein the microencapsulation process is nowadays a rapidly developing, versatile, and fairly mature technique. Depending on product requirements, a PCM microcapsule may range from 0.01 μm to 1000 μm in size and have a spherical, granular, lumpy, or other shape.

To make a PCM mattress, PCM microcapsules are mixed into a foaming material, which is then formed into a mattress, or a finished mattress is coated with PCM microcapsules on the surface only. In either case, the "microcapsules" are used to absorb external heat, and theoretically a mattress possessing the properties of a PCM will be able to dissipate heat rapidly, allowing a user to lie comfortably on the mattress without having to resort to electrical appliances (e.g., an air conditioner that produces cool or warm air) for temperature regulation. However, the inventor of the present invention has found that either approach leaves something to be desired. "Mixing PCM microcapsules into a foaming material" is disadvantageous in that the PCM microcapsules tend to impair the elasticity and smoothness, and thus lower the quality, of the resulting mattress as early as when the PCM microcapsules are mixed with the foaming material to form the mattress. "Coating a mattress with PCM microcapsules", on the other hand, produces a mattress which may lose its heat dissipation function when the body skin of a user lying on the mattress is pressed against and covers the PCM microcapsules. This is because the surface of the mattress will be covered by the user's body skin on one side and the foam in the mattress on the other side, making it impossible for any accumulated heat to escape. The PCM microcapsules may thus absorb too much heat to transfer to the ambient air effectively and hence fail to produce the intended cooling effect.

In light of the above, the inventor of the present invention wondered whether a novel structure with PCM microcapsules can be designed to have consistently high product yield and quality and to also solve the problem of heat accumulation resulting from a user's body skin covering the PCM microcapsules. The issue to be addressed by the present invention, therefore, is to improve the structures and manufacturing processes of various conventional mats according to the properties of PCM microcapsules so that the foregoing objective can be achieved.

BRIEF SUMMARY OF THE INVENTION

In view of the fact that applying PCM microcapsules to a conventional mattress may compromise product yield and is ineffective in dealing with heat accumulation, and in order to overcome these drawbacks of the prior art, the inventor of the present invention put years of practical experience into extensive research and repeated tests and improvements and finally succeeded in developing a mat with a thermostatic layer between two layers of foam to reduce heat accumulation and the manufacturing process thereof.

One objective of the present invention is to provide a mat having a thermostatic layer between two layers of foam to reduce heat accumulation. The mat includes a supporting foam layer and an air permeable foam layer in addition to the thermostatic layer. The top side and the bottom side of the supporting foam layer define a first thickness therebetween. The thermostatic layer includes a plurality of PCM microcapsules and a bonding material. The PCM microcapsules and the bonding material are distributed over the top side of the supporting foam layer, with the bonding material surrounding the PCM microcapsules. The top side and the bottom side of the air permeable foam layer define a second thickness therebetween, wherein the second thickness is smaller than the first thickness. Moreover, the pores in the air permeable foam layer are larger than those in the supporting foam layer. The bottom side of the air permeable foam layer is attached to the thermostatic layer such that the air permeable foam layer is bonded to the supporting foam layer via the bonding material in the thermostatic layer. As the PCM microcapsules can communicate with the ambient air through the pores in the air permeable foam layer, the heat accumulation problem of the prior art, caused by a user's body skin covering the PCM microcapsules, is solved.

Another objective of the present invention is to provide a method for making a mat having a thermostatic layer between two layers of foam to reduce heat accumulation. The method begins by positioning an air permeable foam layer on a processing platform. Then, a plurality of PCM microcapsules are distributed over one side of the air permeable foam layer by screen printing. Next, a bonding material is applied over the same side of the air permeable foam layer to surround PCM microcapsules, thereby forming the thermostatic layer. A supporting foam layer is then attached to the thermostatic layer. The supporting foam layer has two corresponding sides defining a first thickness therebetween. The air permeable foam layer also has two corresponding sides defining a second thickness therebetween, and the second thickness is smaller than the first thickness. Furthermore, the pores in the air permeable foam layer are lager than those in the supporting foam layer. The supporting foam layer is bonded to the air permeable foam layer through the bonding material in the thermostatic layer.

As the resulting mat has a simple structure and the method does not involve the foaming processes of the foam layers, the mat is expected to have high product yield and quality while being adaptable to products of different sizes and shapes.

BRIEF DESCRIPTION OF THE SEVERAL VIEWS OF THE DRAWINGS

The structural features, manufacturing process, and objectives of the present invention can be better understood by referring to the following detailed description of an illustrative embodiment in conjunction with the accompanying drawings, in which.

DETAILED DESCRIPTION OF THE INVENTION

Figure 1:
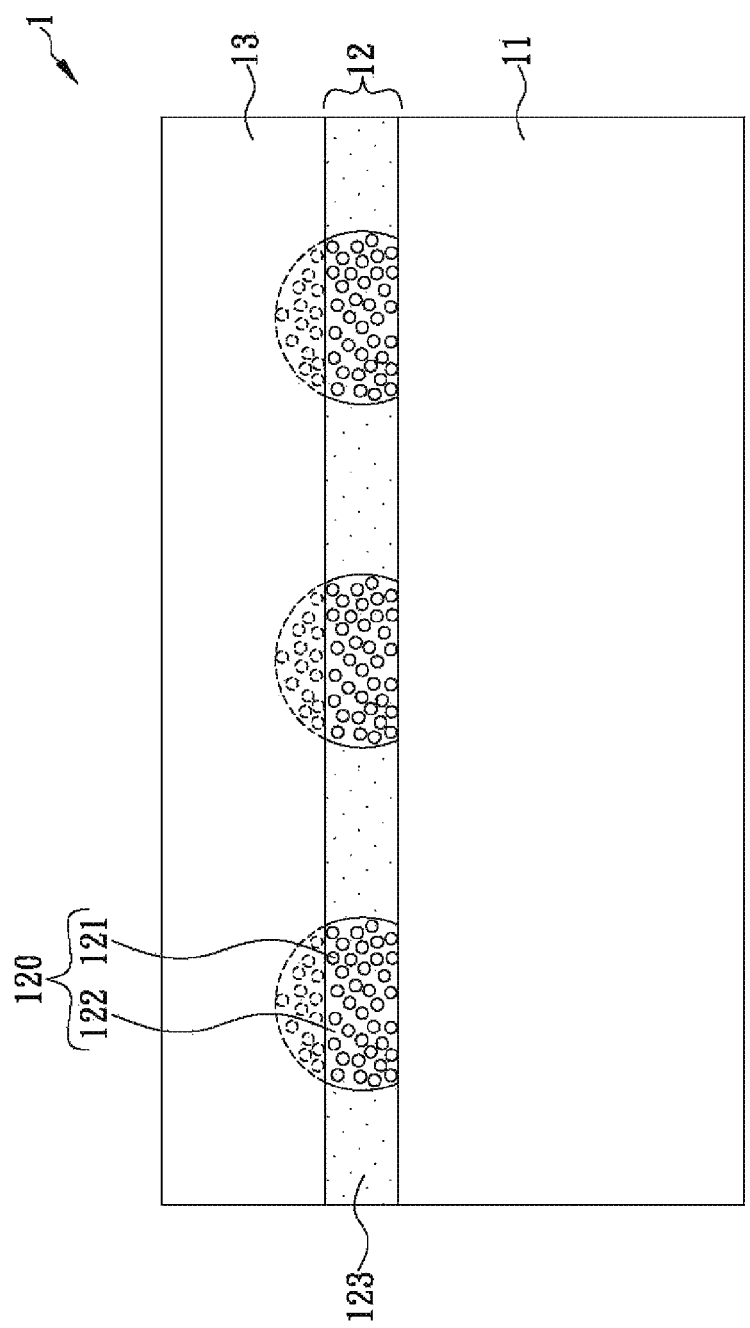
FIG. 1 schematically shows the mat in a preferred embodiment of the present invention.

The present invention relates to a mat with a thermostatic layer between two layers of foam to reduce heat accumulation and the manufacturing process thereof. As referring to FIG. 1, it is a schematic drawing of the mat 1 in a preferred embodiment of the present invention, the mat 1 includes a supporting foam layer 11 (a temperature-sensitive, viscoelastic, open-cell layer), a thermostatic layer 12, and an air permeable foam layer 13 (a compliant air permeable layer). The supporting foam layer 11 (e.g., a piece of memory foam, silicone foam, or slow-recovery foam) can be cut to the size and shape of a mattress, seat cushion, or back cushion and has a first thickness (e.g., 10~30 cm but not necessarily so) defined between its top and bottom sides.

The thermostatic layer 12 includes a plurality of PCM microcapsules 121 and a bonding material 123 (e.g., a water-based adhesive), wherein each PCM microcapsule 121 includes a microcapsule shell encapsulating a PCM. As the manufacturing processes of PCMs are well known in the art, and the ingredients used may be freely adjusted as needed, no further description is given herein in these respects. Please note that the PCM microcapsules 121 are barely identifiable with the naked eye due to their extremely small physical volumes and are depicted only schematically in the drawings to show their relative positions.

The PCM microcapsules 121 are distributed (e.g., by screen printing or by coating evenly) over the top side of the supporting foam layer 11. The bonding material 123 is also applied over the top side of the supporting foam layer 11 and surrounds the PCM microcapsules 121 to form the thermostatic layer 12 (which may be formed on either the supporting foam layer 11 or the air permeable foam layer 13 by screen printing or an even coating process, as detailed further below). The air permeable foam layer 13 matches the supporting foam layer 11 in shape and has a second thickness (e.g., 2~5 cm but not necessarily so) defined between its top and bottom sides, wherein the second thickness is smaller than the first thickness. The pores in the air permeable foam layer 13 (which in this embodiment is a piece of highly air permeable porous foam) are larger than those in the supporting foam layer 11. The bottom side of the air permeable foam layer 13 is attached to the thermostatic layer 12 such that the air permeable foam layer 13 is bonded to the supporting foam layer 11 through the bonding material 123 in the thermostatic layer 12.

When a user lies on the mat 1, the user's body skin is not in direct contact with the thermostatic layer 12, so the PCM microcapsules 121 can still communicate with the ambient air through the pores in the air permeable foam layer 13. After absorbing heat from the user indirectly through the air permeable foam layer 13, the PCM microcapsules 121 can dissipate the heat rapidly to the ambient air to keep the mat 1 cool. Thus, the prior art problem of failure to effectively dissipate the heat accumulated in a conventional PCM microcapsule-coated mat when the PCM microcapsules are covered by the body skin of a user lying on the mat is solved.

In this embodiment, both the supporting foam layer 11 and the air permeable foam layer 13 are viscoelastic polyurethane foam but are rendered different in structure (e.g., pore size) and property (e.g., elasticity and supporting strength) by changing the foaming process or condition. More specifically, the supporting foam layer 11 is a slow-recovery supporting material capable of pressure relief, and the air permeable foam layer 13 is provided therein with pores composed of a plurality of interconnected holes that are in communication with one another and that therefore give the latter foam such aliases as reticular foam and filtering foam. The foaming processes of the foam layers 11 and 13 are well known in the art and will not be further described herein (see, for example, Taiwan Invention Patent No. I303163, granted to the inventor of the present invention).

In this preferred embodiment of the present invention, the PCM microcapsules 121 are mixed with an adhesive 122 (e.g., resin) in advance in order to create a plurality of thermostatic units 120 (in the form of spheres for example) and distribute the thermostatic units 120 over the supporting foam layer 11 at equal spacings. More specifically, the mixture obtained by mixing the PCM microcapsules 121 with the adhesive 122 is applied over the top side of the supporting foam layer 11 by a screen printing machine for use with particle-containing materials so as to form the thermostatic units 120 and distribute the thermostatic units 120 at equal spacings (i.e., in a spotty manner). The adhesive 122 ensures that the PCM microcapsules 121 are fixed to the supporting foam layer 11 in clusters.

In addition to providing high breathability and thereby enabling the PCM microcapsules 121 to dissipate heat as expected, the present invention has such advantages as structural simplicity and ease of implementation. Even if the mat 1 has a relatively small size (e.g., used as a pillow mat), product yield will not be affected, and the manufacturing process will not be made more difficult. Furthermore, by designing the steps of the manufacturing process properly, the heat dissipation performance of the mat 1 can be enhanced. To facilitate understanding of the manufacturing process of the mat 1, a detailed description of the steps is given below with reference to FIG. 3 and FIGS. 2A~2C in conjunction with FIG. 1:

(301) An air permeable foam layer 13 is positioned on a processing platform 2, wherein two corresponding sides of the air permeable foam layer 13 define a second thickness therebetween. (In FIG. 2A, the air permeable foam layer 13 is inverted, meaning the bottom side of the air permeable foam layer 13 is the side on which a user will lie.)

(302) By screen printing, a plurality of PCM microcapsules 121 are distributed over one side of the air permeable foam layer 13 in a spotty manner. During the process, some of the PCM microcapsules 121 enter the pores in the air permeable foam layer 13.

(303) The aforesaid side of the air permeable foam layer 13 is coated with a bonding material 123 so that the bonding material 123 surrounds the PCM microcapsules 121, forming a thermostatic layer 12.

(304) A supporting foam layer 11 is attached to the thermostatic layer 12, wherein two corresponding sides of the supporting foam layer 11 define a first thickness therebetween, the first thickness being larger than the second thickness, and wherein the pores in the air permeable foam layer 13 are larger than those in the supporting foam layer 11. The supporting foam layer 11 is bonded to the air permeable foam layer 13 via the bonding material 123 in the thermostatic layer 12.

Figure 2A:
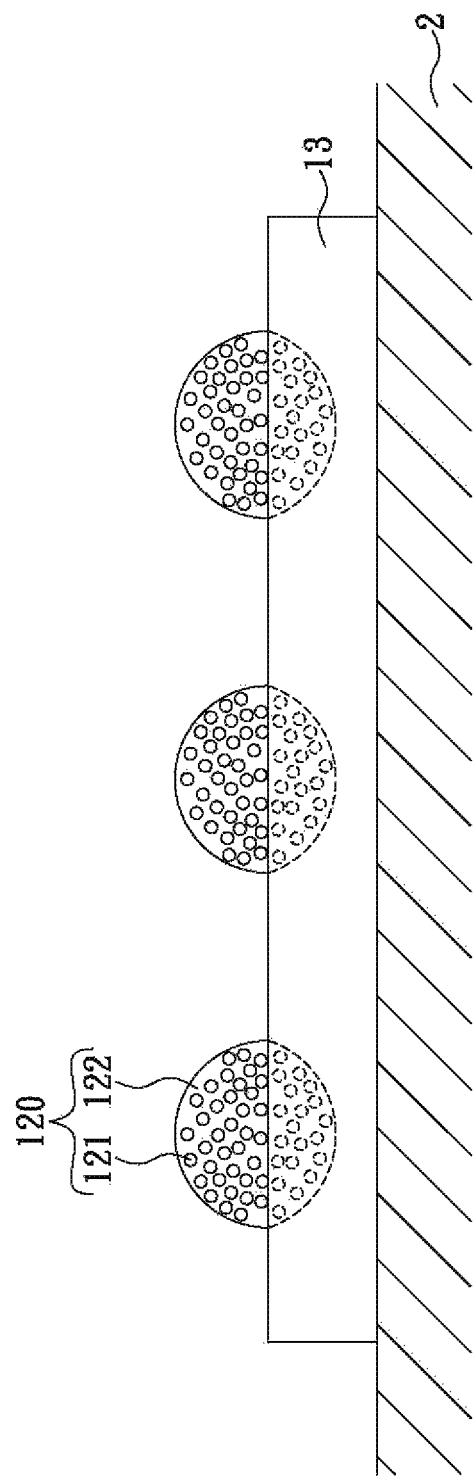
FIGS. 2A~2C schematically show how the mat in FIG. 1 is made.
Figure 2B:
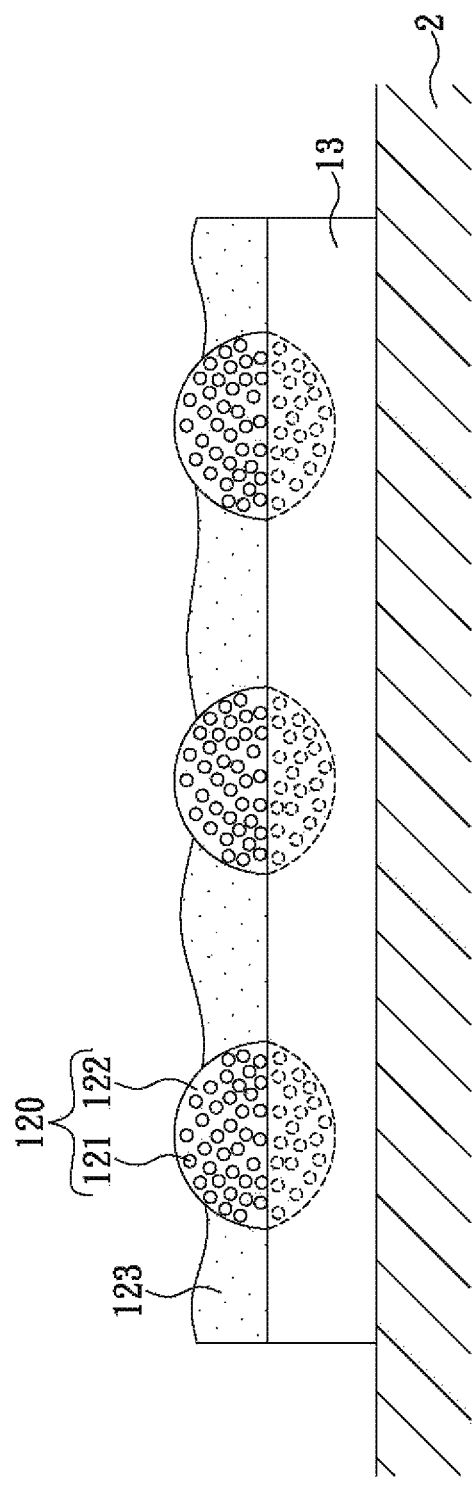
Figure 2C:
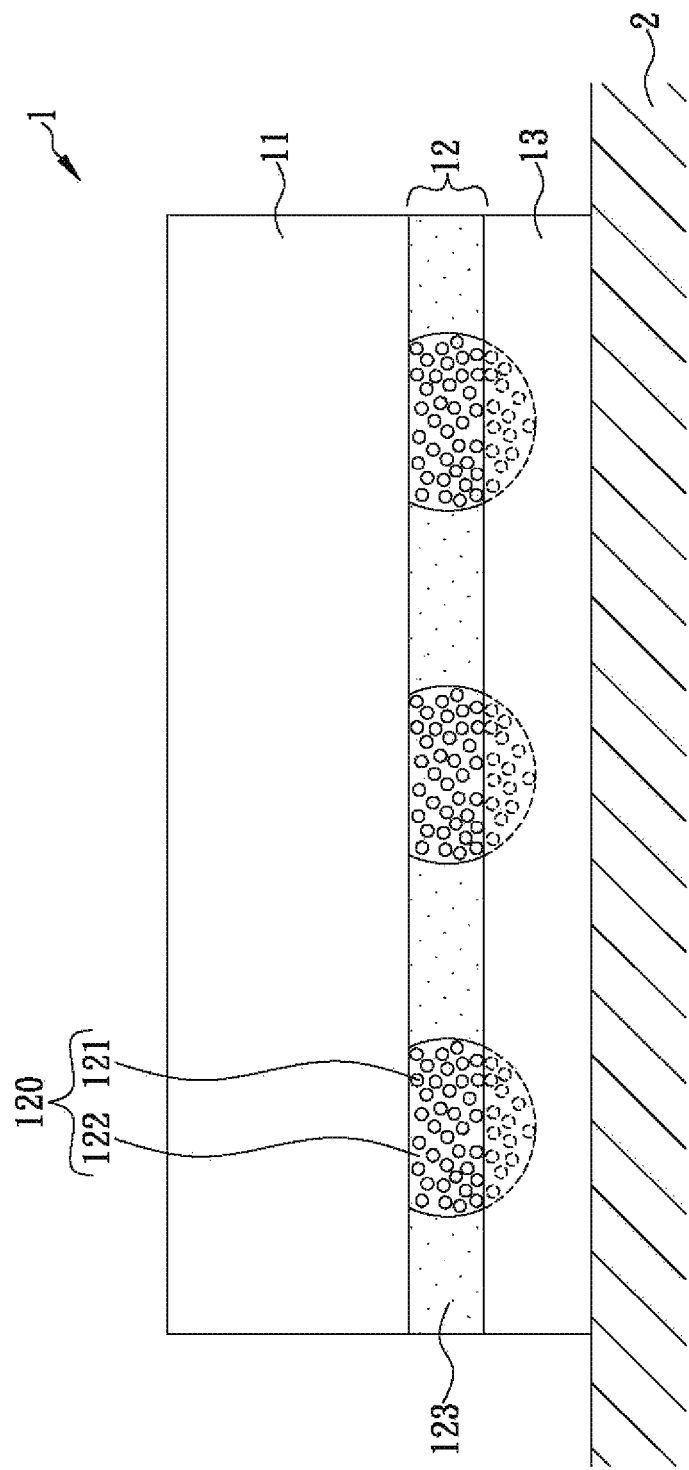
Figure 3:
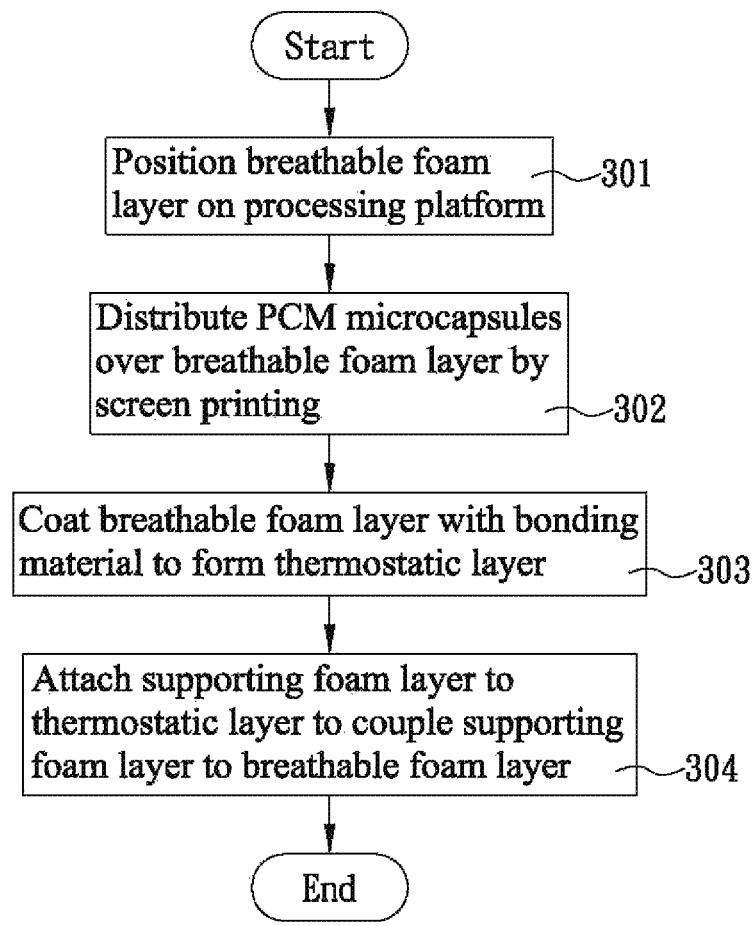
FIG. 3 is a flowchart of the manufacturing process of the mat in FIG. 1.

In this manufacturing process, the air permeable foam layer 13, which has "larger pores" than the supporting foam layer 11 and lies "on the top side of the mat 1 (which top side refers to the top side of the mat 1 in FIG. 2C after the mat 1 is turned upside down into the state shown in FIG. 1)", is coated with the PCM microcapsules 121 such that some of the PCM microcapsules 121 enter the pores in the air permeable foam layer 13, as shown in FIG. 2C. Accordingly, once the completed mat 1 is turned over and a user lies on the mat 1 (or more particularly on the bottom side of the air permeable foam layer 13 in FIG. 2C), the PCM microcapsules 121 are closer to the user's body skin and can absorb and dissipate heat therefrom more effectively than if it were the supporting foam layer 11 that is coated with the thermostatic layer 12, in which case the PCM microcapsules 121 would be farther, and spaced apart by the bonding material 123, from the user's body skin and less effective in heat dissipation even if some of the PCM microcapsules 121 have entered the pores in the supporting foam layer 11.

In this embodiment, the PCM microcapsules 121 are first mixed with an adhesive 122 and then distributed over the aforesaid side of the air permeable foam layer 13 by screen printing. More specifically, the PCM microcapsules 121 are mixed with the adhesive 122 to form a plurality of thermostatic units 120, which are spaced apart from one another and are adhesively attached to the aforesaid side of the air permeable foam layer 13.

The manufacturing process of the present invention is advantageous in that the distribution of the PCM microcapsules 121 does not involve the foaming processes of the foam layers 11 and 13 and hence will not impair the elasticity or smoothness of the foam layers 11 and 13. Besides, the manufacturing process of the present invention does not require a structurally complicated jig, frame, or other accessory, and this allows the overall structure of the mat 1 to be and stay simple. For example, product yield will not be adversely affected when the mat 1 is manufactured as a pillow mat, which is relatively small in size, or a neck rest, whose shape is relatively special. The mat 1, therefore, has a broad scope of application. It should be pointed out that the technical features of the present invention include mixing the PCM microcapsules 121 with the adhesive 122 to form the thermostatic units 120 and distributing the thermostatic units 120 between the foam layers 11 and 13 in a "spotty" manner. The "spotty" design has the following four effects:

(1) To ensure stability of the thermostatic layer 12: As previously mentioned, the PCM microcapsules 121 are extremely small in volume. Once mixed with the adhesive 121 and distributed between the foam layers 11 and 13 by screen printing, the PCM microcapsules 121 form clusters, i.e., the thermostatic units 120, whose size (i.e., the mesh size of the screen) is larger than the pores in the air permeable foam layer 13 to ensure that the PCM microcapsules 121 will not pass through and move out of the air permeable foam layer 13.

(2) To ensure the desired physical properties of the mat 1: After being distributed between the foam layers 11 and 13 in a spotty manner at equal spacings, the thermostatic units 120 will not adhere to one another. This ensures that the thermostatic layer 12 will not damage the overall elasticity or fluffiness of the mat 1.

(3) To prevent the thermostatic layer 12 from forming a thin film: If the PCM microcapsules 121 and the adhesive 122 are evenly applied between the foam layers 11 and 13, the PCM microcapsules 121 will form a thin brittle film, which is detrimental to the physical properties of the foam layers 11 and 13 because the film not only is prone to cracking and chipping, but also may shrink when dry.

(4) In addition, the PCM microcapsules 121 can be mixed, through the adhesive 122, into a plurality of thermostatic units 120, respectively, which are spaced apart from each other and are independent with each other, and during the coating process, the thermostatic unit 120 will penetrate into the pores of the air permeable foam layer 13, and then can firmly grasp the air permeable foam layer 13. Thus, when the air permeable foam layer 13 being stretched by a reasonable external force, the extension thereof will be limited to an extent between the thermostatic units 120, the thermostatic units 120 themselves are not subject to the extension, thereby the thermostatic units 120 won' be easy to fall off from the air permeable foam layer 13.

The embodiment described above is only a preferred one of the invention and is not intended to be restrictive of the technical features of the invention. All equivalent changes easily conceivable by a person of ordinary skill in the art who is aware of the technical content of the invention should fall within the scope of patent protection sought by the applicant.

What is claimed is:

1. A mat with a thermostatic layer between two layers of foam to reduce heat accumulation, comprising:
a supporting foam layer having a top side and a bottom side, wherein the top side and the bottom side of the supporting foam layer define a first thickness there between the thermostatic layer, comprising a plurality of phase change material (PCM) microcapsules and a bonding material, wherein the PCM microcapsules and the bonding material are distributed over the top side of the supporting foam layer, and the bonding material surrounds the PCM microcapsules; and
an air permeable foam layer having a top side and a bottom side, wherein the top side and the bottom side of the air permeable foam layer define a second thickness therebetween, the second thickness is smaller than the first thickness, the air permeable foam layer is provided therein with pores larger than pores in the supporting foam layer, and the bottom side of the air permeable foam layer is attached to the thermostatic layer such that the air permeable foam layer is bonded to the supporting foam layer by the bonding material in the thermostatic layer.

2. The mat of claim 1, wherein some of the PCM microcapsules enter the pores in the air permeable foam layer.

3. The mat of claim 2, wherein the PCM microcapsules are mixed with an adhesive to form a plurality of thermostatic units, and the thermostatic units are spaced apart from one another and are arranged on the top side of the supporting foam layer.

4. The mat of claim 3, wherein the supporting foam layer is memory foam.

5. A method for making a mat with a thermostatic layer between two layers of foam to reduce heat accumulation, comprising the steps of:
   positioning an air permeable foam layer on a processing platform;
   distributing a plurality of phase change material (PCM) microcapsules over a side of the air permeable foam layer by screen printing such that some of the PCM microcapsules enter pores in the air permeable foam layer;
   coating the side of the air permeable foam layer with a bonding material such that the bonding material surrounds the PCM microcapsules to form the thermostatic layer; and
   attaching a supporting foam layer to the thermostatic layer, wherein the supporting foam layer has two corresponding sides defining a first thickness therebetween, the side and a corresponding side of the air permeable foam layer define a second thickness therebetween, the second thickness is smaller than the first thickness, the pores in the air permeable foam layer are larger than pores in the supporting foam layer, and the supporting foam layer is bonded to the air permeable foam layer by the bonding material in the thermostatic layer.

6. The method of claim 5, further comprising the steps of: mixing the PCM microcapsules with an adhesive to produce a mixture, and distributing the mixture over the side of the air permeable foam layer by screen printing such that the mixture of the PCM microcapsules and the adhesive forms a plurality of thermostatic units, wherein the thermostatic units are spaced apart from one another and are adhesively attached to the side of the air permeable foam layer.

* * * * *